US012705104B2

(12) United States Patent
Igelka et al.

(10) Patent No.: US 12,705,104 B2
(45) Date of Patent: Aug. 11, 2026

(54) PRESERVING AND MODIFYING VIRTUAL MACHINE SETTINGS IN REPLICATION-BASED VIRTUAL MACHINE MIGRATION

(71) Applicant: Google LLC, Mountain View, CA (US)

(72) Inventors: Or Igelka, Tel Mond (IL); Ayelet Wald, Petach Tikva (IL)

(73) Assignee: Google LLC, Mountain View, CA (US)

( * ) Notice: Subject to any disclaimer, the term of this patent is extended or adjusted under 35 U.S.C. 154(b) by 722 days.

(21) Appl. No.: 17/713,507

(22) Filed: Apr. 5, 2022

(65) Prior Publication Data

US 2023/0315530 A1 Oct. 5, 2023

(51) Int. Cl.
*G06F 9/50* (2006.01)
*G06F 9/455* (2018.01)

(52) U.S. Cl.
CPC ........ *G06F 9/5044* (2013.01); *G06F 9/45558* (2013.01); *G06F 2009/45562* (2013.01); *G06F 2009/4557* (2013.01)

(58) Field of Classification Search
CPC .................................................... G06F 9/5044
See application file for complete search history.

(56) References Cited

U.S. PATENT DOCUMENTS 11,886,926 B1 * 1/2024 Gadalin et al. ....... G06F 9/5077
2012/0324183 A1 * 12/2012 Chiruvolu et al. ..... G06F 12/16
2013/0311988 A1 11/2013 Boss et al.
2014/0082201 A1 * 3/2014 Shankari et al. ....... H04L 47/70
2014/0115161 A1 * 4/2014 Agarwal et al. ...... G06F 15/173
2016/0188353 A1 * 6/2016 Shu et al. ........... G06F 9/45533
2019/0310881 A1 10/2019 Gupta et al.
2020/0306640 A1 * 10/2020 Kolen et al. .......... A63F 13/655
2020/0389522 A1 * 12/2020 Cherivirala et al. ......................... H04L 67/1095
2021/0250299 A1 * 8/2021 Liu et al. ............ H04L 47/2425
2021/0349767 A1 * 11/2021 Asayag et al. ........ G06F 9/5088
2022/0027182 A1 * 1/2022 Igelka et al. ........ G06F 9/45558
2023/0144949 A1 * 5/2023 Zhang et al. ......... G06F 9/5044

OTHER PUBLICATIONS

When to Choose AWS Application Migration Service, [online] [retrieved Mar. 25, 2022]. Retrieved from the Internet: <https://aws.amazon.com/application-migration-service/when-to-choose-aws-mgn/>, 9 pages.

(Continued)

*Primary Examiner* — James J Debrow
(74) *Attorney, Agent, or Firm* — Lerner David LLP

(57) ABSTRACT

Aspects of the disclosure are directed to modifying and preserving virtual machine settings at a target computing environment as virtual machine settings change for a migrating virtual machine. The migration system balances matching the most up-to-date settings of the virtual machine in its source environment, with making changes as necessary to the settings of the virtual machine so that the settings are compatible with a target computing environment, updating the settings as needed. The migration system can continuously or periodically monitor changes in source virtual machine settings and/or in the source or target computing environments, and update target virtual machine settings up to the point at which a cut-over operation is performed and migration is complete.

20 Claims, 5 Drawing Sheets

(56) References Cited

OTHER PUBLICATIONS

About Azure Migrate, Feb. 17, 2022, <https://docs.microsoft.com/en-us/azure/migrate/migrate-services-overview>, 7 pages.
What is Movere?, Oct. 27, 2021, <https://docs.microsoft.com/en-us/movere/overview>, 6 pages.
International Search Report and Written Opinion for International Application No. PCT/US2023/017426 dated Jul. 7, 2023. 14 pages.

* cited by examiner

PRESERVING AND MODIFYING VIRTUAL MACHINE SETTINGS IN REPLICATION-BASED VIRTUAL MACHINE MIGRATION

BACKGROUND

Virtual machine migration is the process by which a computing system or platform moves, copies, or clones a virtual machine from a source computing environment to a target computing environment. The computing resources can include processors, memory, and other components for hosting a virtual machine. The source and target computing environments can be on the same physical computing device, or in different physical devices at the same or different physical locations.

Replication-based migration refers to a process in which a virtual machine is moved or copied by continuously taking snapshots of the virtual machine while operating in a source computing environment and replicating the snapshots or differences between snapshots to a target computing environment. Migration ends when a cut-over operation is performed, in which the virtual machine at the source computing environment is shut down, the final snapshot is replicated onto the target computing environment, and a virtual machine at the target computing environment is started.

A virtual machine is usually attached with at least one disk. Migration involves copying the contents of at least one disk attached to the virtual machine to at least one disk of a target computing environment. A device performing migration can read the contents of a disk as a disk snapshot, and during replication-based migration multiple disk snapshots or differences between disk snapshots may be identified for moving or copying to disks of the target computing environment. A virtual machine snapshot represents the complete state of a virtual machine at a given time, including one or more disk snapshots taken of the virtual machine during the given time. Virtual machine snapshots and disk snapshots are accessible for reading even if the state of the corresponding virtual machines and disks has changed.

Virtual machines can be configured to operate in a computing environment according to one or more settings. These settings include definitions or configurations associated with the virtual machine, the computing environment on which it operates, and/or how the virtual machine operates in the computing environment.

BRIEF SUMMARY

Aspects of the disclosure are directed to updating and preserving virtual machine settings at a target computing environment as virtual machine settings change for a migrating virtual machine. A migration system as described herein is configured to monitor and update virtual machine settings for a migrating virtual machine, to balance matching the most up-to-date settings of the virtual machine in its source environment, with making changes as necessary to the settings of the virtual machine so that the settings are compatible with a target computing environment, updating the settings as needed. The migration system can continuously or periodically monitor changes in source virtual machine settings and/or in the source or target computing environments, and update target virtual machine settings up to the point at which a cut-over operation is performed and migration is complete.

Aspects of the disclosure can provide for a method including: receiving, by one or more processors, target computing environment parameters for virtual machine settings for a virtual machine at the target computing environment; receiving, by the one or more processors, source virtual machine settings for a virtual machine at a source computing environment; and updating, by the one or more processors and using the source virtual machine settings, current target virtual machine settings with virtual machine settings compatible with the target computing environment and satisfying the target computing environment parameters.

Aspects of the disclosure can provide for a system including one or more processors, the one or more processors configured to: receive target computing environment parameters for virtual machine settings for a virtual machine at the target computing environment; receive source virtual machine settings for a virtual machine at a source computing environment; update current target virtual machine settings with virtual machine settings compatible with the target computing environment and satisfying the target computing environment parameters; determine that a current migration cycle includes performing a cut-over operation to complete the migration of the virtual machine to the target computing environment; and in response to the determination that a current migration cycle of a migration of the virtual machine includes performing the cut-over operation, send the current target virtual machine settings to the target computing environment to be applied to the virtual machine in the target computing environment.

Aspects of the disclosure can provide for one or more non-transitory computer-readable storage media including instructions that, when executed by one or more processors, cause the one or more processors to perform operations including: receiving target computing environment parameters for virtual machine settings for a virtual machine at a target computing environment; receiving source virtual machine settings for the virtual machine at a source computing environment; updating current target virtual machine settings with virtual machine settings compatible with the target computing environment and satisfying the target computing environment parameters; determining that a current migration cycle of a migration of the virtual machine includes performing a cut-over operation to complete the migration of the virtual machine to the target computing environment; and in response to determining that the current migration cycle includes performing the cut-over operation, sending the current target virtual machine settings to the target computing environment to be applied to the virtual machine in the target computing environment.

Aspects of the disclosure provide for one or more processors configured to perform operations of methods described herein.

Aspects of the disclosure can provide for one or more features, such as the features described herein. In one example, aspects of the disclosure include all of the following features, in combination.

The method can further include determining, by the one or more processors, that a current migration cycle of a migration of the virtual machine includes performing a cut-over operation to complete the migration of the virtual machine to the target computing environment; and in response to determining that the current migration cycle includes performing the cut-over operation, sending, by the one or more processors, the current target virtual machine settings to the target computing environment to be applied to the virtual machine in the target computing environment.

The method can further include generating a test clone configured with the current target virtual machine settings.

The method can further include receiving, by the one or more processors, initial virtual machine settings for the virtual machine before or during one or more migration cycles of the migration; and setting the initial virtual machine settings as the current target virtual machine settings.

The method can further include repeatedly performing, by the one or more processors, the receiving of the source virtual machine settings and the updating of the current target virtual machine settings for each migration cycle of the one or more migration cycles.

The method can further include: receiving, by the one or more processors, data characterizing hardware utilization of the virtual machine in the source computing environment; and updating, by the one or more processors, the initial virtual machine settings or the current target virtual machine settings based on at least the target computing environment parameters, the hardware utilization of the virtual machine in the source computing environment, and hardware constraints imposed on virtual machines in the target computing environment.

Updating the initial virtual machine settings or the current target virtual machine settings further includes: receiving, by the one or more processors, data characterizing hardware utilization of a test clone of the virtual machine in the target computing environment, the test clone generated during the one of the one or more migration cycles; and updating, by the one or more processors, the current target virtual machine settings further based on the received data characterizing hardware utilization of the test clone.

The current target virtual machine settings can include values characterizing a computing resource allocation for a migrating virtual machine.

The method can further include determining, by the one or more processors, that the target computing environment parameters have been updated during the migration; and in response to determining that the target computing environment parameters have been updated, updating, by the one or more processors, the current target virtual machine settings with virtual machine settings compatible with the target computing environment and satisfying the updated target computing environment parameters.

The method can further include sending, by the one or more processors, user output indicating the current target virtual machine settings; receiving, by the one or more processors, user input specifying updated target computing parameter values; and updating, by the one or more processors, the current target virtual machine settings with virtual machine settings compatible with the target computing environment and satisfying the updated target computing environment parameters received in the user input.

DETAILED DESCRIPTION

Overview

Figure 1:
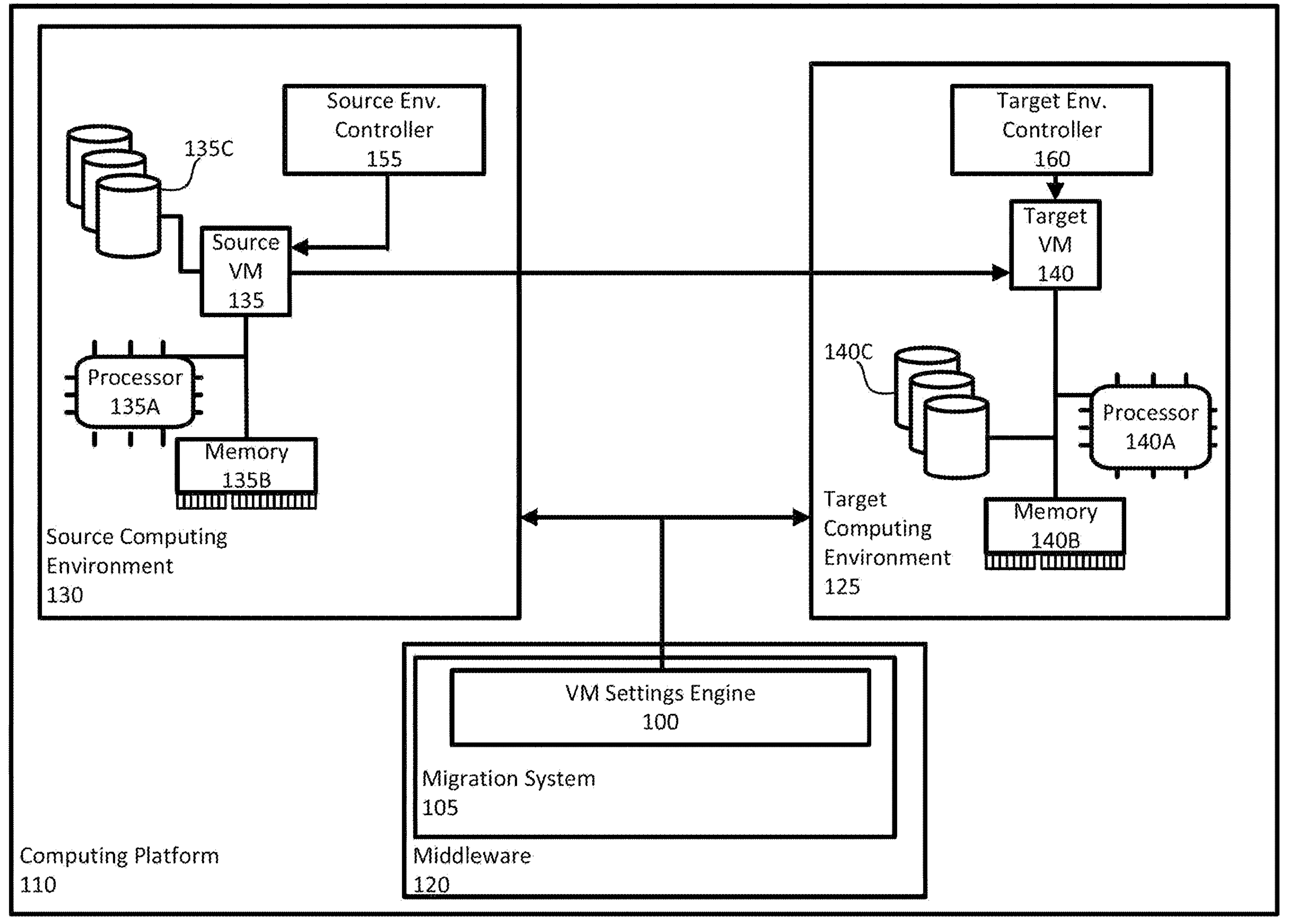
FIG. 1 is a block diagram of a computing platform implementing a virtual machine settings engine of a migration system for updating virtual machine settings during a migration of a virtual machine, according to aspects of the disclosure.

Aspects of the disclosure are directed to updating and preserving virtual machine settings at a target computing environment as virtual machine settings change for a migrating virtual machine. A migration system as described herein is configured to monitor and update virtual machine settings for a migrating virtual machine. The migration system as described herein is configured to monitor and update virtual machine settings for a migrating virtual machine. The migration system balances matching the most up-to-date settings of the virtual machine in its source environment, with making changes as necessary to the settings of the virtual machine so that the settings are compatible with a target computing environment, updating the settings as needed. Virtual machine settings can include definitions or configurations associated with the virtual machine, the computing environment on which it operates, and/or how the virtual machine operates. A controller for the environment can be configured to manage a virtual machine, which can receive values for different settings, for example binary, numerical, or string values, and manage a virtual machine according to those received settings. Example settings can include hardware settings, such as the amounts, types, sizes, speeds, etc. for hardware allocated to a virtual machine.

Hardware can include, for example processors, such as central processing units (CPUs), graphics processing units (GPUs), field-programmable gate arrays (FPGAs), application-specific integrated circuits (ASICs) such as tensor processing units (TPUs). Hardware can also include volatile and/or non-volatile memory or storage devices. Virtual machines may be implemented with any combination of computer hardware, including examples provided herein with reference to FIG. 5. Hardware can also include controllers, such as for small computer system interface (SCSI), integrated drive electronics (IDE), non-volatile memory host express (NVMe), USB, serial ports, DVD, CD, etc.

Virtual machine settings can also include a number of settings specifying different characteristics of the virtual machine and the hardware on which the virtual machine is executed. One example type of settings can be bootloader settings. Example settings of this type can include bootloader type, e.g., basic input output BIOS, UEFI, and associated options, e.g., secure boot, boot order, etc. Virtual machine settings can also specify a guest operating system type and version, disk provisioning type, e.g., thick or thin, network connection configuration, and bootstrapping parameters, such as parameters for packaging and distributing software in virtual machines, e.g., open virtualization format (OVF). Virtual machine settings can also include settings for devices attached to the virtual machine, such as devices for exchanging data, such as a peripheral component interconnect (PCI) device.

Virtual machine settings can also include settings characterizing how the virtual machine relates to other virtual machines and/or a service running and configured to monitor and maintain the virtual machine. Example settings of this type can include data specifying the location of the virtual machine in the context of different resource pools, folders, etc. Example settings of this type may also include associations between other virtual machines, for example used together for implementing a common service or application on a computing platform.

Migration of a virtual machine from a source to a target computing environment is not an instantaneous process, and instead may take hours or days to complete, limited by computing resources, e.g., processor cycles, memory bandwidth, storage bandwidth, network bandwidth, etc., available to a system implementing a migration process. During the migration, virtual machine settings for a virtual machine in a source environment may change, for example due to user input.

During replication-based migration, a migration system, for example, on a computing platform, migrates a source virtual machine by continuously taking snapshots of the source virtual machine, while the source virtual machine is still running in the source environment. Migration occurs over one or more migration cycles. The number and occurrence of migration cycles can depend on how the migration system is configured, for example in accordance with a process for scheduling migration cycles and/or a process for deciding when to perform a migration cycle.

During the migration but before the cut-over operation, the migration system can maintain one or more test clones of a target virtual machine, matching the state and settings of the source virtual machine at a corresponding migration cycle. The migration system may maintain multiple test clones for a virtual machine each corresponding to a different migration cycle. Each test clone has a respective set of target virtual machine settings for use while deployed in the test environment.

As part of performing the migration of a virtual machine, the migration system can receive source virtual machine settings and data such as hardware utilization data of a virtual machine in the source and/or target environments. The migration system can further receive constraints, options, and costs associated with how a virtual machine may be configured in the target computing environment. Based on the received source virtual machine settings, the hardware utilization data, and the additional target computing parameters, e.g., constraints, options, and costs, the migration system can convert the source virtual machine settings to a corresponding format compatible with the target environment and create initial target virtual machine settings.

During migration and up until executing the cut-over operation for a virtual machine, the migration system can continuously or periodically monitor and receive updated data, e.g., source virtual machine settings, hardware utilization data, constraints, options, costs, etc., and update the initial target virtual machine settings. As part of updating the target virtual machine settings, the migration system can perform right-sizing, by which the migration system converts computing resource allocation specified for the virtual machines to a comparable computing resource allocation of either a similar or a different capacity in the target computing environment. Right-sizing by the system can be recommended based on a balancing of different factors, e.g., the relative performance gains for increasing computing resource allocation, with saved costs and resources achieved by decreasing computing resource allocation to mitigate under-utilization.

Aspects of the disclosure provide for at least the following technical advantages. A migration system can update virtual machine settings for a migrating virtual machine to a target environment while balancing the preservation of source virtual machine settings with parameters and hardware restrictions of the target environment. Hardware for a source environment often does not have a one-to-one correspondence with hardware in a target environment. The migration system can identify comparable target virtual machine settings for migrating a virtual machine. From the perspective of a user, the migration may occur automatically, and without specific user input to resolve potential conflicts in converting settings from the source environment to comparable settings in the target environment.

In addition, the migration system can factor user input, changes to source virtual machine settings, target environment parameters, and other data to maintain a current set of target virtual machine settings continuously or periodically. When the virtual machine is ready to complete migration, e.g., when the cut-over operation is performed, the migration system has the current target virtual machine settings ready to send to the target environment, reducing down time otherwise caused by configuring a virtual machine in the target environment. Currently maintained target virtual machine settings can also be used in the creation of test clones for migrating virtual machines. As the target virtual machine settings are updated, the migration system applies the most up-to-date settings to test clones created after the update to the settings.

Example Systems

FIG. 1 is a block diagram of a computing platform 110 implementing a virtual machine settings engine 100 of a migration system 105 for updating virtual machine settings during a migration of a virtual machine, according to aspects of the disclosure. The computing platform 110 can include a source computing environment 130 ("source environment") and a target computing environment 125 ("target environment"). In other examples, either the source or target computing environments may be implemented on a separate platform, datacenter, or other collection of devices.

The computing platform 110 can be a collection of computing devices, such as servers, in one or more physical locations and connected over a network to one or more other computing devices. Middleware 120 can include for example one or more physical computing devices and/or one or more virtual machines configured to perform migration of a virtual machine. For example, the computing platform 110 can be a cloud computing platform accessible by different computing devices over the internet. A computing platform can refer to a central physical or virtual environment of devices running software accessible to other devices over a network. The computing platform 110 can implement a number of target computing environments, e.g., target computing environments 125. The devices can include servers but may vary from example-to-example. The software running on the computing platform 110 can include applications or services running in virtual machines. In some examples, the computing platform is a containerized environment running containers on bare metal architecture or in virtual machines. Middleware 120 can be implemented as part of the computing platform 110, source computing environment 130, target computing environment 125, and/or as one or more devices on a system separate from, but in communication with, the computing platform 110. In some examples as described herein, different components of the migration system 105, including the virtual machine settings engine 100, can be implemented across multiple devices in multiple different environments.

It is understood that in various examples, multiple source computing environments and/or multiple target computing environments may be implemented in one or more different physical locations, for example across different platforms or data centers. For example, source environment 130 may be a data center maintained by an entity, such as an individual or organization like a company or enterprise. Computing environments may be connected over a network, as a network local to the computing platform 110, and/or a public network, such as the internet.

The migration system 105 is configured for performing a migration of a virtual machine from a source environment to a target environment. In FIG. 1, source computing environment 130 includes a source virtual machine 135. The migration system 105 is configured to perform a migration of the source virtual machine 135 over one or more migration cycles, for example until a cut-over operation is performed and a corresponding target virtual machine 140 is deployed in the target environment 125. During migration before the cut-over operation, the migration system 105 can generate one or more test clones corresponding to the source virtual machine 135. Although described herein with reference to a single virtual machine, it is understood that the migration system may be configured to perform mass migration, in which multiple virtual machines are migrated to one or more target environments, possibly in parallel to each other. Different virtual machines may be targeted for migration at different times.

The migration system 105 can include a virtual machine settings engine 100. As described herein with reference to FIGS. 2-4, the virtual machine settings engine 100 is configured to preserve and update current target virtual machine settings for deploying the target virtual machine 140. When a cut-over operation is performed, the virtual machine settings engine 100 can send the target virtual machine settings to a target environment controller 160 of the target environment 125, for use in deploying the target virtual machine 140. The virtual machine settings engine can receive data characterizing the source virtual machine, such as hardware utilization and source virtual machine settings, from a source environment controller 155 implemented as part of the source environment 130.

The source virtual machine 135 can be deployed with computing resources including a processor 135A, memory 135B, and storage device 135C. As described herein with reference to FIG. 5, the processor, memory, and/or storage devices 135A-C can be any type or quantity of respective processor, memory, or storage devices allocated to the source virtual machine 135. The target virtual machine 140 deployed on the target environment 125 is also allocated with computing resources including a processor 140A, memory 140B, and storage devices 140C.

During replication-based migration, the migration system 105 migrates a source virtual machine by taking snapshots of the source virtual machine, potentially while the source virtual machine is still running in the source environment. Migration occurs over one or more migration cycles. The number and occurrence of migration cycles can depend on how the migration service is configured, for example in accordance with a process for scheduling migration cycles and/or a process for deciding when to perform a migration cycle, as described herein.

A migration cycle can refer to the completion of a transfer of a virtual machine snapshot, or data characterizing changes between snapshots, to the target environment. The migration cycles of a replication-based migration can be any of a variety of types. Example types include: first sync, in which the entire state of the source virtual machine is captured as a virtual machine snapshot; periodical, in which data characterizing a difference between an updated and a previous state of the source virtual machine is captured in accordance with a scheduling algorithm or timing constraint; a user-triggered migration cycle, in which a migration cycle occurs in response to user input; and a cut-over operation, in which the source virtual machine is shut down and a final snapshot of the source virtual machine is copied and sent to the target environment.

During the migration but before the cut-over operation, the migration system 105 can maintain a test clone of a target virtual machine, matching the state and settings of the source virtual machine at a corresponding migration cycle. The migration service may maintain multiple test clones for a virtual machine each corresponding to a respective migration cycle. The multiple test clones can correspond to the same migration cycle, in some examples. Each test clone has a respective set of target virtual machine settings for use while deployed in the target environment. As described herein, the settings engine 100 can generate and update settings that may be applied to these test clones.

In some examples, the migration system 105 can implement live migration of virtual machines, e.g., source virtual machine 135 to target virtual machine 140. In a live migration, the memory state, e.g., RAM state of each migrating virtual machine is copied, and the network connectivity of each migrating virtual machine is retained, such that the virtual machine is migrated without disconnecting the service running on the virtual machine. As part of performing a live migration, the migration system 105 can maintain and generate test clones for migrating virtual machines, up until a cut-over operation is performed. It is understood that references to migration may be substituted with live migration, without loss of generality.

Source environment controller 155 and target environment controller 160 can be configured to configure source virtual machine 135 and target virtual machine 140, respectively. The controllers 155, 160 may act as hypervisors for virtual machines in each controller's respective environment. In some examples, the controllers 155, 160 are implemented separately from hypervisors or other components for managing a respective environment and/or virtual machines hosted in the respective environment of each controller. The controllers 155, 160 can receive virtual machine settings from the migration system 105 and/or from a user computing device, as well as provide information related to their respective computing environment and virtual machines running in the respective computing environments. As described in more detail herein with reference to FIG. 2, this can include options, constraints, costs, and data related to hardware utilization of virtual machines running in a computing environment.

In some examples, the migration system 105 and/or the engine 100 may not receive virtual machine settings from a controller, but instead directly from the computing environment. For example, migration system 105 may implement an interface, such as an API. The interface can expose certain fields or parameters of a computing environment and/or virtual machines hosted in the environment, for access by the migration system 105 and/or the engine 100.

Figure 2:
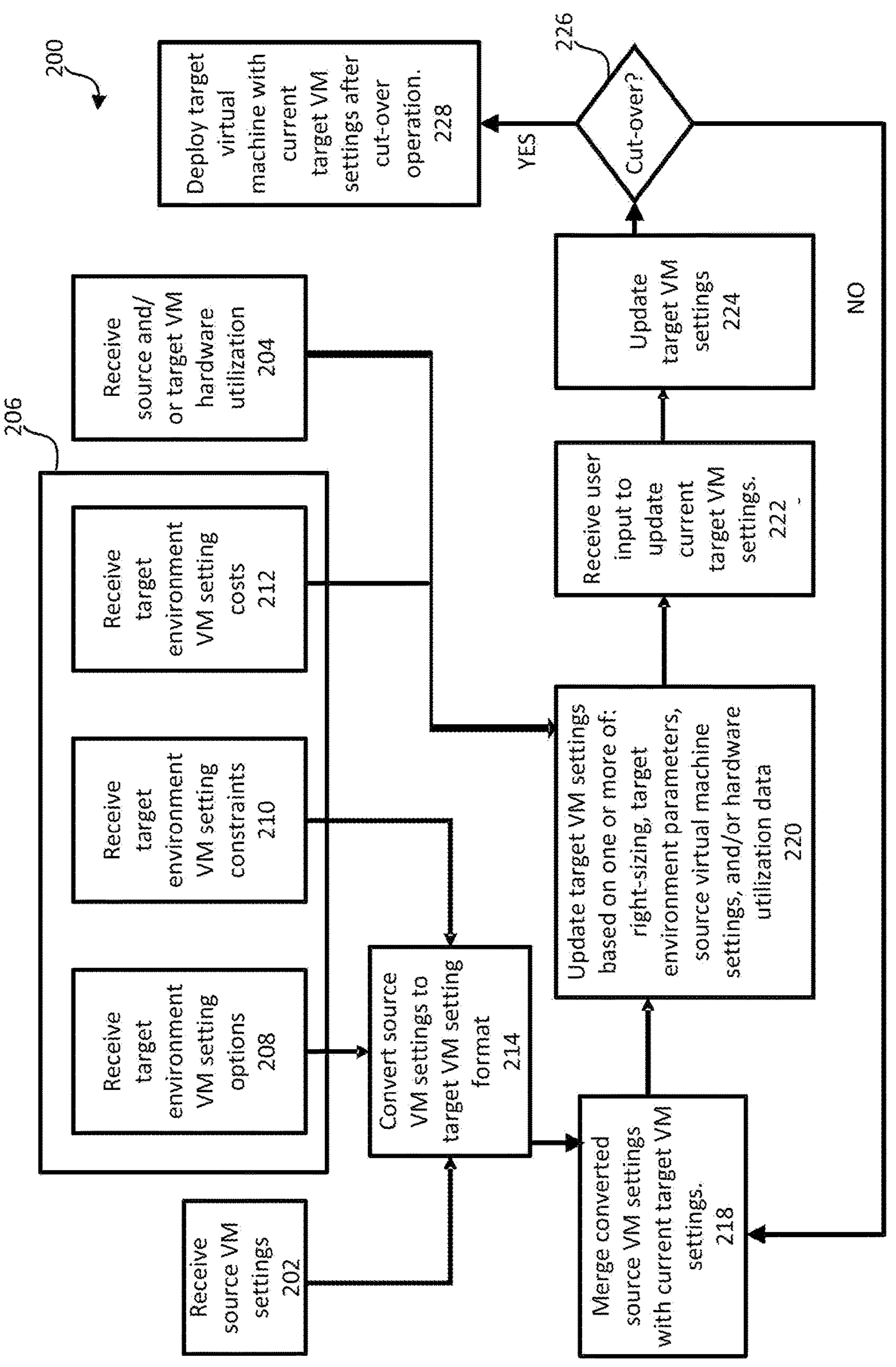
FIG. 2 is a flow diagram of an example process for updating virtual machine settings of a virtual machine during its migration, according to aspects of the disclosure.

FIG. 2 is a flow diagram of an example process 200 for updating virtual machine settings of a virtual machine during its migration, according to aspects of the disclosure.

The process 200 can be performed by the virtual machine settings engine 100 during a migration of a virtual machine from a source to a target computing environment.

The virtual machine settings engine 100 receives source virtual machine settings, according to block 202. When a virtual machine migration is initiated, the engine 100 can begin receiving source virtual machine settings for the virtual machine being migrated. The current settings for the source virtual machine at the beginning of migration are saved by the engine 100 as the initial source virtual machine settings. For migration operations involving multiple virtual machines, the engine 100 can save settings for each respective virtual machine to be migrated. To receive the source virtual machine settings, the engine 100 can query data for the source computing environment by querying a controller for the source virtual machine or querying the source virtual machine itself.

In some examples, the engine 100 can receive virtual machine settings for each virtual machine of a list of virtual machines available for migration. The engine 100 can maintain an ongoing inventory of source virtual machine settings from this list, so that if migration is initiated for a virtual machine in the list, the engine 100 already has the source virtual machine settings.

The engine 100 can receive current target virtual machine settings for example, periodically, during each migration cycle and generation of a test clone, or before the generation of the cut-over virtual machine for completing the migration. In addition, or alternatively, the engine 100 can receive source virtual machine settings in response to user input, for example through input received by a user computing device from which instructions to initiate migration were received. The engine 100 may also receive updated source virtual machine settings periodically, but measured over periods of time, for example every day, as opposed to during migration cycles.

To determine hardware utilization of the migrating virtual machine, the engine 100 can receive data characterizing source and/or target virtual machine hardware utilization, according to block 204. For example, the engine can repeatedly sample hardware utilization metrics from the virtual machine or from a component monitoring the virtual machine, such as an environment controller.

For determining hardware utilization and for other operations described herein as related to monitoring a virtual machine or receiving information corresponding to a virtual machine, the engine 100 may be implemented as one or more agents. An agent may be implemented in a computing environment, e.g., a source or target environment, for monitoring virtual machines and/or test clones, and collecting information such as hardware utilization data. The agent can report the data to one or more components of the engine 100, which may, for example, also be implemented in the source and/or target environment, and/or as middleware, for performing the process 200.

As with receiving source virtual machine settings, the engine 100 can sample hardware utilization periodically, for example once every hour. In some examples, the sampling can occur following a snapshot replication, or before performing the cut-over operation. In some examples, the engine 100 can query a guest operating system for the source or target virtual machine, and/or query the environment controller monitoring the source or target virtual machine. In some examples, the engine 100 can sample some aspects of hardware utilization, such as network bandwidth, by using a network sniffing tool or technique to receive information from network ports or other connections between a virtual machine and another virtual machine or physical device. The engine 100 can compare hardware utilization between a source and a target virtual machine, e.g., from one or more test clones during migration, and determine how the hardware utilization differs.

As described in more detail herein, the engine 100 can collect both source and target virtual machine hardware utilization data for performing right-sizing. The engine 100 can right-size source virtual machine settings to scale certain allocated hardware, such as increased memory, based on the received hardware utilization measured from the source virtual machine, but without exceeding available hardware resources available on the target environment. For example, if the hardware utilization of the source virtual machine indicates that the source virtual machine is operating at or near its maximum memory allocation, the engine 100 can right-size the memory allocation for the target virtual machine settings in excess of the source virtual machine allocation, but no higher than the total memory usage indicated by the target virtual machine's hardware utilization. In other examples, the engine 100 performs right-sizing without receiving hardware utilization for the target virtual machine.

The engine 100 can receive target computing environment parameters, according to block 206. Block 206 can represent multiple sub-blocks, corresponding to sub-operations that the engine 100 can perform as part of receiving target computing environment parameters, which may refer to, for example, options available on the target environment for configuring virtual machines, constraints on the target environment for implementing a virtual machine, and/or cost data associated with implementing a virtual machine in the target environment. In different examples, some or all of the operations represented by blocks 208, 210, and 212 can be performed by the engine 100 as part of receiving target computing environment parameters, according to block 206.

According to block 208, the engine 100 can receive setting options available for the target virtual machine in the target computing environment. These options can include a number of pre-determined configurations available for a virtual machine in the target computing environment, for example certain tiers of memory allocation, processor speed, and/or network bandwidths or storage bandwidths. Options can include any and all possible values for different values that can form part of the settings for a virtual machine in the target computing environment.

According to block 210, the engine 100 can also receive constraints associated with the target computing environment, for example setting a minimum or maximum value for memory allocation, processor allocation, etc. Constraints can also include specific computing environments that are allowed or not allowed as a target for migrating the source virtual machine.

Additional constraints can be received by the engine 100 as user input. These constraints can impose individual or aggregate rules or constraints, for example either on a specific migrating virtual machine, or across all virtual machines that may be undergoing migration. For individual constraints, user input can constrain the values for some or all of the settings for the virtual machine in the target environment. For example, the engine 100 can receive user input constraining target virtual machine settings to no more than x gigabytes of RAM, or no less than a processor allocation of y gigahertz. Aggregate user constraints can be applied across multiple migrating virtual machines, for example so as to not exceed an average cost to operate the virtual machines in their respective target environments once migrated.

According to block 212, the engine 100 can receive costs associated with different configurations of virtual machines available on the target computing environment. For example, different tiers of memory allocation may be associated with different monetary costs imposed by an entity maintaining the target computing environment. As described herein, the engine 100 can update target virtual machine settings at least based on associated costs to operate the target virtual machine at different settings. In addition, or alternatively, the engine 100 can provide cost information to the user as part of a prompt for receiving input in updating the target virtual machine settings. The received options and/or constraints can also be provided as part of a user prompt for updating the target virtual machine settings, for example to guide the user in providing valid input settings, such as user-defined memory allocation for the target virtual machine that does not violate a maximum constraint imposed on the target computing environment.

Although the examples described herein describe the engine 100 receiving data, e.g., according to blocks 202-212, in some examples, the engine 100 at least initially generates current target virtual machine settings without input, for example as default settings corresponding to the target environment.

In some examples, the engine 100 is configured to receive updated source virtual machine settings, target environment parameters, and/or source or target environment hardware utilization data. In some examples, the engine 100 may monitor for changes in source virtual machine settings. Upon detecting any changes, or changes within or in excess of a predetermined threshold, the engine 100 may automatically adjust the target virtual machine settings, accordingly, as described herein with reference to blocks 218 to 226. In some examples, the engine 100 may stop the migration due to incompatibility between the updated source virtual machine settings and the target environment, and/or notify or alert the user about any of the aforementioned, e.g., through a user output of a user computing device in communication with a computing platform implementing the migration system.

In some examples, a change can be when a disk is added, removed, or resized on the source virtual machine while the migration is in progress. The migration system 105 can begin to also migrate the added source disk to attach to the target VM. In other examples, a removed source disk is dropped accordingly, and a resized source disk is re-migrated from scratch as part of the next migration cycle of the migrating virtual machine. Other example changes that may occur in the source virtual machine settings may be changes in the amount of RAM that is assigned to the source virtual machine and/or its number of CPUs.

According to block 214, the engine 100 is configured to convert source virtual machine settings into settings consistent with the format of the target environment. In one example, in which the source and target computing environments are identical or nearly identical, conversion is not necessary, as settings from the source environment are already applicable to settings for virtual machines in the target environment.

However, as is often the case, the target environment and the source environment will differ in some respects. For example, different types of hardware may be available in one environment and not another, or one environment may impose certain constraints for virtual machine settings, such as a minimum or maximum memory allocation, not present in the other environment. Further, controllers or other components of different environment types may be configured to receive virtual machine settings in different formats. For example, different environment types may receive virtual machine settings according to different languages, such as variants of XML, JSON, API calls for respective unique APIs, etc.

To perform the conversion, the engine 100 can apply predetermined rules based on the environment type for the source and target environments. The engine 100 receives the source virtual machine settings and outputs matching target virtual machine settings based on predetermined rules for the source and target environment types. The engine 100 can convert the source virtual machine settings into a format readable by a controller or other component of the target environment responsible for configuring a virtual machine with those settings. The engine 100 may also change values of different settings, based on constraints or options available, for example, on the source environment but not in the target environment. The engine 100, as part of converting the source VM settings, can receive target environment options and constraints, according to blocks 208 and 210.

In one example, the engine 100 can parse and match fields corresponding to different settings in the source and target environment by common words or phrases appearing in the source virtual machine settings, such as “CPU,” “RAM,” “disk,” etc. For matched settings sharing common words, the engine 100 can copy values from source virtual machine settings (such as 32 gigabytes of RAM) as values for target virtual machine settings.

Predetermined rules for converting between environment types can outline how discrepancies between the source and target environments should be resolved by the engine 100. In one example, if the source virtual machine settings specify the allocation of a type of memory not available in the target environment, for example double data rate 5 (DDR5) RAM, then according to the predetermined rules, the engine 100 can convert the source virtual machine setting for memory allocation to a corresponding memory type, for example double data rate 4 (DDR4) RAM, that is closest in performance to the memory type of the source environment but available in the target environment. Conversion as described herein may occur as a separate step, e.g., according to block 214, and/or while the target virtual machine settings are updated, e.g., according to block 220.

As another example, the target environment may allocate disks of different sizes than the source environment. If the source virtual machine settings specify allocating 100 gigabytes of disk space to a virtual machine, but the target environment only permits allocating disk space in increments of 64 gigabytes, then the predetermined rules can specify that the engine 100 convert the applicable source virtual machine setting value to 128 gigabytes for the converted target virtual machine settings. This is at least because 128 gigabytes is the smallest allocation available for a virtual machine in the target environment that still satisfies the source virtual machine setting of a 100-gigabyte allocation. Similar conversion can be applied by the engine 100 for other hardware resource types, particularly when there is a discrepancy in how resources can be allocated between the source and target environments.

In some examples, target virtual machine settings converted from the source virtual machine settings can be provided for user confirmation by the engine 100. One reason to prompt for user input can be to make decisions for specific settings in the target virtual machine settings that would otherwise be provided a default value according to the predetermined rules. For example, the source environment may include types of processors that have comparable, but not identical, equivalents in the target environment. In some examples, the engine 100 can provide a default value for settings specifying processor type in the converted target virtual machine settings, while in other examples the engine 100 can prompt for user input for selecting one of the multiple different comparable processor types.

The engine 100 can prompt or default to certain selections in response to earlier user input provided, instructing the engine 100 when and when not to prompt the user for input. As another example, the engine 100 can be configured to make default selections for converting some settings, and only prompt the user for input when a selection would incur a certain cost to operate in meeting or exceeding a predetermined threshold.

In some examples, the engine 100 can implement a machine learning model or other form of model trained or tuned according to a corpus of training data. The input of the model can be source virtual machine settings, for example in a file or other format associated with a source computing environment for a migrating virtual machine. The output of the model can be virtual machine settings for a target computing environment and converted from the input source virtual machine settings. The corpus of training data can include multiple training examples of virtual machine settings corresponding to a first computing environment and labeled with virtual machine settings corresponding to one or more second computing environments.

The training data can be generated using a combination of manual and automatic techniques. For example, training examples can be labeled by hand for each of a variety of different potential target computing environments. As another example, training examples may be labeled after measuring and analyzing the performance of different virtual machines at a target environment implementing settings converted from a source computing environment. The measuring and/or analysis can be performed by the engine 100 and/or another component, such as a training system for training the model implemented by the engine 100.

The training data can be generated to encode notions of user preferences and/or preferences for different settings during different points in time. For example, training data can be labeled with settings observed to be preferred by users associated with virtual machines migrating by the system 105. In yet other examples, the model may also be configured to receive time and/or location data corresponding to the time at which source virtual machine settings are converted, as well as the location of the device hosting the migrating virtual machine. The model can be further trained to incorporate time and/or location data to convert settings in a contextual manner, e.g., by generating target virtual machine settings with fewer computational requirements required during times of peak activity.

The model can be trained, for example, using backpropagation with updates to one or more weights of the model, based on a loss computed between a model output and a label for an input training example. The loss can be computed, for example, using a distance function between the label and the model output. In various examples, the model can be trained on the corpus of training data using stochastic, mini-batch, or batch gradient descent. An example architecture for a model implemented by the engine 100 can be a neural network, e.g., a feed-forward neural network, an autoencoder, etc. In other examples, other statistical modeling techniques may be used, such as those based on unsupervised or semi-supervised learning techniques.

In one example, a source virtual machine may have three disks of an unknown type, e.g., an unknown backing storage type or speed, a single CPU of 4 GHz, and 4 GB of RAM. After receiving the source virtual machine settings, which can specify the hardware in this example source virtual machine, the engine 100 can convert the settings into a format corresponding to virtual machine settings in the target computing environment. The converted settings may also specify a 4 GHz processor, 4 GB of RAM, and three hard disks. Because the type of disks was not specified from the source virtual machine settings, the engine 100 can automatically substitute disks of an available type in the target virtual machine settings.

As described herein, the engine 100 can monitor for changes in the source virtual machine settings and repeat the conversion according to block 214 with updates to the source virtual machine settings.

After converting the initial source virtual machine settings, the engine 100 can merge the converted source virtual machine settings with the current target virtual machine settings, according to block 218. Current target virtual machine settings refer to settings maintained and updated by the engine 100 during migration, which, if a cut-over operation for the migrating virtual machine were to be performed, or if a test clone were to be created for it, would be the settings for the created target virtual machine in the target environment.

During a merge, the engine 100 identifies differences—sometimes referred to as the delta—between the currently converted source virtual machine settings, and previously converted source virtual machine settings. Previously converted source virtual machine settings can refer to source virtual machine settings that were converted by the engine 100 prior to updates made to the source virtual machine settings. The currently converted source virtual machine settings are settings converted from the source virtual machine settings after an update, e.g., during migration of a corresponding migrating virtual machine. The engine updates the current target virtual machine settings based on the identified differences. For example, the engine 100 can determine that, since migration began, the source virtual machine had its RAM allocation doubled and an extra disk attached. Using, for example, the currently converted source virtual machine settings, the engine 100 can update the current target virtual machine settings to indicate a double RAM allocation and an extra disk. As part of generating the current target virtual machine settings, the engine 100 can also right-size the settings, as described herein. The current target virtual machine settings are parameter values for settings on the target environment generated by the engine 100. Current virtual machine settings generated for the first time by the engine 100 may be referred to as initial virtual machine settings. Initially, the current target virtual machine settings may be the converted source virtual machine settings, e.g., because there are no current target virtual machine settings to merge with.

According to block 220, the engine 100 can update the target virtual machine settings multiple times throughout migration, for example based on one or more right-sizing, target environment parameters, source virtual machine settings, and/or hardware utilization data. Changes in the target virtual machine settings can be provided as user output. The trigger to cause the engine 100 to update target virtual machine settings can be, for example, time-based or based on the number of migration cycles that have passed since the last update. The trigger can be user input, or in response to receiving updated source virtual machine settings, updated options, constraints, or costs for the target computing environment, updated user input, and/or updated source or target virtual machine utilization.

The engine 100 can update the current virtual machine settings using the source virtual machine settings and the target computing environment parameters by searching for a set of virtual machine settings that (a) are compatible for configuring a virtual machine in the target computing environment, while (b) satisfying the target environment parameters. The engine 100 can use the options available in the target computing environment parameters to determine what the set of possible target virtual machine settings can be. For example, the engine 100 can first determine whether the source virtual machine settings are compatible with the target computing environment, for example only specifying the use of hardware resources available in the target computing environment. If not, then for each incompatible setting, the engine 100 can determine a corresponding matching setting in the target computing environment. In some examples, the setting may be removed as having no equivalent in the target computing environment, e.g., as a source environment specific feature.

In some examples, the engine 100 can search the set of virtual machine settings according to optimization objectives, e.g., increase performance, or reduce cost to operate a virtual machine with resource allocations specified in the settings. In one example, the problem can be modeled as lower operational cost, e.g., measured using energy consumed, number of operations performed, processor cycles, etc., while maintaining a minimum performance threshold. Different parameters for performing the optimization process can include settings that may be specified in virtual machine settings for the target computing environment. Constraints can be modeled as inequalities or other formulas. Example optimization processes that can be used include linear programming and gradient descent. The engine 100 may be configured to perform one or more iterations of the optimization process until meeting one or more stopping criteria. Stopping criteria can include, for example, a maximum number of iterations of performing the optimization process, a minimum improvement threshold for the improvement of the current parameters as input to an objective function, user input, etc.

In one example, the engine 100 may be pre-configured with a map of hardware resources, for example one type of hardware resource such as a processor type in the source environment is predetermined to match with another processor type in the target computing environment. As another example, the engine 100 can approximate, for example based on specifications of the hardware type, including processor speed, memory capacity, network or storage bandwidths, etc., the corresponding hardware type closest in specification available in the target computing environment.

In some examples of numerical settings, e.g., specifying a certain processor speed, such as 8 GHz, the engine 100 can check whether a virtual machine in the target computing environment can have an allocation of a processor with that speed, and if not, reduce or increase the allocation as necessary in the current target virtual machine settings. The engine 100 can then check whether constraints in the target computing environment are met and perform a similar check of each setting for satisfaction of the constraints, adjusting to a satisfactory setting value or setting type as needed.

As part of updating the target virtual machine settings, the engine 100 can determine the hardware utilization of a virtual machine, for example, either in the source environment or in the target environment and update target virtual machine settings according to one of a variety of different objectives. For example, if source virtual machine settings indicate that the source virtual machine is allocated 32 gigabytes of RAM, the engine 100 can determine whether or not the source virtual machine is utilizing this allocation of memory, and if not, update target virtual machine settings to reflect actual hardware utilization more closely by the virtual machine. Other metrics can be quantified in hardware utilization for a virtual machine, including memory usage, processor usage, for example in idle to active processor cycles, and/or network bandwidth utilization, measured for example in data transmitted per unit of time. If, for example, the source virtual machine on average was using only 16 gigabytes of RAM in operation, the engine 100 can update the target virtual machine settings to "right-size" RAM allocation to 16 gigabytes of RAM, instead of 32 gigabytes. In this specification, right-sizing refers to one or more operations performed by the engine 100 for updating or matching target virtual machine settings, based on the hardware utilization of the source virtual machine.

By right-sizing target virtual machine settings, the engine 100 can reduce the cost to operate and maintain a target virtual machine. Cost reduction can be measured, for example, in reduced computing resources allocated to the target virtual machine that would be under-utilized. The computing resources saved by right-sizing the target virtual machine settings can instead be allocated elsewhere, such as for a virtual machine requiring the additional allocation.

In some examples, the engine 100 can right-size target virtual machine settings in conjunction with received user preferences or constraints. For example, the engine 100 may receive user input indicating a minimum memory allocation, which the engine 100 may enforce regardless of whether the source virtual machine is under-utilizing allocated memory. In the example above in which RAM allocation is right-sized to 16 gigabytes based on memory utilization, the engine 100 may nonetheless keep RAM allocation to 32 gigabytes in the current target virtual machine settings, if the engine 100 received a user constraint requiring RAM allocation to be at minimum 32 gigabytes.

As another example of right-sizing, the engine 100 determines that a source virtual machine is CPU-intensive and disk-intensive, based on disk reads and/or writes of the source virtual machine meeting or exceeding a predetermined threshold. The engine 100 can determine a computational bottleneck for the source virtual machine allocated with a 4 GHz processor. The bottleneck may be determined, for example, based on measuring latency in the time between receiving input to perform computational operations at the source virtual machines, and receiving corresponding output in response to performing those operations. The engine 100 may further determine that the source virtual machine never utilizes more than 1.1 GB of RAM during the time the engine 100 monitored the source virtual machine while it was running. In this example, the engine 100 can right-size current target virtual machine settings such that the settings specify a hardware allocation of an 8 GHz CPU, solid-state drives instead of hard disks, and only 2 GB of RAM, which may be the minimum allocation of RAM in the target computing environment.

Right-sizing the current target virtual machine settings can be performed automatically by the engine 100, or in response to user input confirming the change in target virtual machine settings. In the latter case, the engine 100 can provide one or more right-sizing recommendations, as described in more detail with reference to FIG. 3. For example, the engine 100 can periodically provide user output suggesting changes in target virtual machine settings based on determining hardware utilization by the source virtual machine. The engine 100 can receive user input in response, for example confirming the recommended change in the target virtual machine settings or rejecting the recommended changes. Suggested changes can be periodically provided during the migration process, up until the migration process is complete. Suggested changes can be provided after a snapshot. As another example, the engine 100 can provide final suggested right-sized target virtual machine settings upon receiving input from the user to initiate a cut-over operation.

User input providing confirmation for the correctness of the recommended changes can also be used to label training data for training a model implemented by the engine 100 to perform right-sizing. The model can be trained using a number of training examples. Each training example can include virtual machine settings and characteristics, such as hardware utilization and computing environment parameters, associated with a virtual machine implemented using the input virtual machine settings. The label to a training example can be a right-sized version of the virtual machine settings. These training examples may be automatically generated, for example, based on receiving a confirmation from user input for a provided recommendation of right-sized virtual machine settings. The labeled training data can be used for training the model, for example using techniques described herein with reference to virtual machine setting conversion and FIG. 2.

The settings engine 100 can receive user input to update current target virtual machine settings, according to block 222. In some examples, a user computing device, such as a user computing device from which a request for migrating a virtual machine was received, may receive a prompt to configure target virtual machine settings for a migrating virtual machine. The engine 100 may receive virtual machine settings as user input, and use those settings as target computing environment parameters, e.g., as constraints, to which the engine 100 tries to meet while updating the current target virtual machine settings. In some examples, user input virtual machine settings may be set as the initial virtual machine settings and updated throughout migration, for example as described with reference to FIG. 2.

In some examples, the engine 100 may check the received target virtual machine settings from a user computing device to ensure that the settings are compatible with the target computing environment. The engine 100 can send a prompt confirming that the settings are compatible with the target computing environment or send a prompt indicating that the settings are not compatible for one or more reasons. In some examples, the engine 100 may provide available options for potential target virtual machine settings in the target computing environment, and/or provide recommendations based on current target virtual machine settings generated, for example during the process 200.

The engine 100 can send current target virtual machine settings to the user computing device for review and receive input indicating approval or rejection. The engine 100 can receive values for different settings. For example, user input may include adding, removing, or resizing the target virtual machine settings, e.g., adding a blank disk to it, discarding any of the source VM's disks while migrating, adding a network adapter to the target virtual machine, etc. This input can be used to update the target environment parameters, for example as new or updated constraints or options. Target virtual machine settings received from the user computing device can take effect from the point forward with regards to any test clone and/or cut-over operation that will be created or performed during the migration of the virtual machine.

In some examples, for example as a configuration option, the engine may or may not further update the current target virtual machine settings and/or notify the user computing device about any further recommendations after receiving user input according to block 222.

The engine can provide a recommendation in the form of a text or other output for different potential target virtual machine settings based on the right-sizing mechanism. In some examples, the engine 100 can provide, as output, supporting data of hardware utilization under different potential sets of virtual machine settings, including, for example, the current target virtual machine settings that the engine 100 would apply once cut over occurs. The engine may also present to the user the prospected costs of each change in the settings—as collected from the target environment or calculated.

In some examples, the engine 100 may only send a prompt to the user computing device as described herein during certain times or events, for example when a test clone is created, or a cut-over operation is performed.

As one example of changes in source virtual machine settings and updates to the current virtual machine settings, a source virtual machine may be allocated 2 GB of RAM, a single CPU of 4 GHz, and a single disk of 10 GB storage. After some migration cycles are completed, a test clone is issued by the migration system 105, with matching allocations specified in its settings. The current target virtual machine settings can be used to generate the test clone. Afterwards, the engine 100 may receive data indicating that the source virtual machine settings for the virtual machine have changed. For example, the source virtual machine may now have allocated 4 GB of RAM and a CPU of 8 GHz. The engine 100, upon detecting this change, can perform some or all of the operations in the process 200 to update the current target virtual machine settings. Thereafter, test clones are generated using the current target virtual machine settings after being updated. This change may occur even if no further migration cycles are completed after the change in the source virtual machine settings.

As another example, only the disks of the source virtual machine may change during migration. For example, initially a source virtual machine may have only two disks, one of 10 GB and one of 100 GB. After some migration cycles are completed for the migrating virtual machine, a test clone may be issued by the migration system with two disks of 10 GB and 100 GB, respectively, with data from the disks of the source virtual machine. The disk allocation of the source virtual machine may then change, for example by increasing the second disk from 100 GB to 200 GB and by adding a third disk with 500 GB. In this example, the changes are applied after a subsequent migration cycle transferring data of those updated disks, and any test clone or cut-over operation performed uses current virtual machine settings at the time of the migration cycle.

If user input is received, the engine 100 can update the current target virtual machine settings further based on the user input, according to block 224. For example, the user input may specify certain constraints, e.g., the use of a certain type of processor, which the engine 100 can use as a constraint to update the current virtual machine settings to the same or comparable processor type available in the target computing environment.

The engine 100 determines whether a cut-over operation is being or has been performed, according to decision block 226. If a cut-over operation is being or has been performed ("YES") then the target virtual machine is deployed with the current target virtual machine settings at the time of the cut-over operation. Otherwise, ("NO"), the engine 100 can repeat some or all of the process 200, including merging current target virtual machine settings with updated source virtual meeting settings, updating the current target virtual machine settings with updated target computing environment parameters and/or user input, and so on. Before deploying the target virtual machine, the engine 100 can send a final confirmatory prompt to a user computing device with the current target virtual machine settings.

Although described in the context of maintaining a set of current target virtual machine settings for configuring a deployed target virtual machine during or after a cut-over operation, the current target virtual machine settings may be used in other ways. For example, if one or more test clones are generated during a migration cycle, the virtual machine settings for the test clones can be the current target virtual machine settings maintained by the settings engine 100.

The operations described herein with reference to FIG. 2 may or may not occur during a migration cycle of a migration of the source virtual machine. The triggers for the engine 100 to receive data and update current target virtual machine settings may be on a continuous or periodic basis, e.g., scheduled, or in response to an event, e.g., detecting changes in the source virtual machine settings, detecting changes in the target computing environment parameters, and/or in response to user input. The operations described with reference to the processes of FIGS. 2-4 may be performed in parallel to each other, in sequence of each other, and/or a combination of both parallel and sequential operations.

Figure 3:
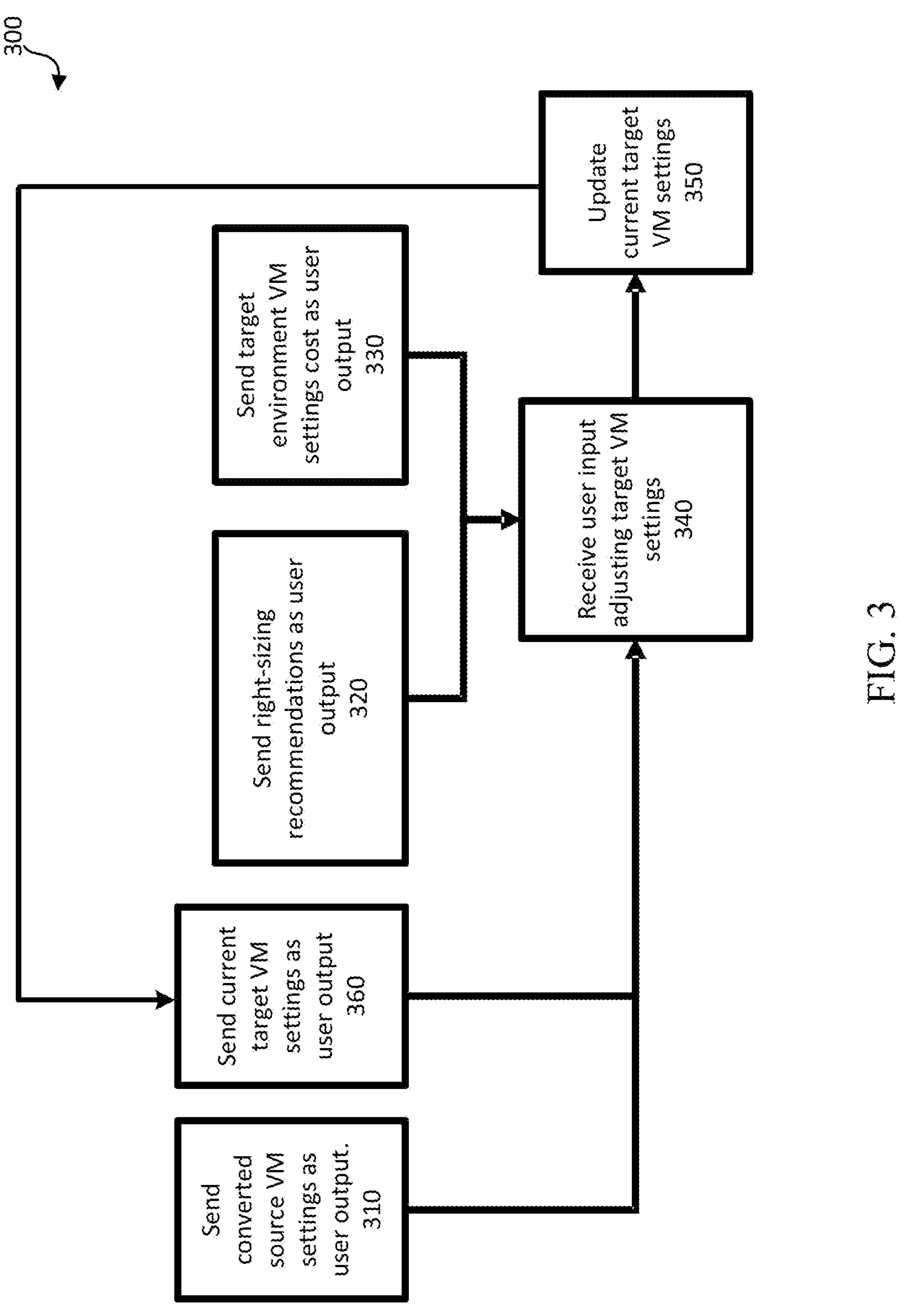
FIG. 3 is a flow diagram of an example process for updating current target virtual machine settings during a migration based on target computing environment parameters received from user input.

FIG. 3 is a flow diagram of an example process 300 for updating current target virtual machine settings during a migration based on target computing environment parameters received from user input. The example process 300 can be a sub-process of the example process 200 or can be performed independent of the process 200. In other examples, the example process 300 can be performed independently of the process 200.

The virtual machine settings engine sends converted target settings as user output, e.g., to a user computing device, according to block 310. The engine can generate the converted target settings from received source virtual machine settings, for example according to block 214 of FIG. 2. In some examples, the engine may receive the converted target settings from one or more processors separate from the engine and configured to receive and convert source virtual machine settings from a migrating virtual machine.

The virtual machine settings engine sends right-sizing recommendations as user output, according to block 320. In some examples, the right-sizing recommendations can be accompanied by supporting data, indicating changes to hardware utilization and cost for proceeding with various different virtual machine settings corresponding to different recommendations for hardware allocation.

The engine 100 sends the target environment virtual machine settings cost as user output, according to block 330. The costs can be costs received from the target computing environment, and/or calculated based on predetermined relationships between certain types or quantities of hardware, and the costs associated with running those types or quantities of hardware.

The engine receives user input adjusting the target virtual machine settings, according to block 340. The engine 100 can verify that the target virtual machine settings are compatible with the target computing environment.

The engine 100 can update current target virtual machine settings, based at least in part on the received user input, according to block 350. As described in more detail herein with reference to FIG. 2, the engine 100 is configured to update current target virtual machine settings based on user input, as well as based on (updated) target computing environment parameters, and hardware utilization data. The engine sends current target virtual machine settings as user output, according to block 360.

Example Methods

Figure 4:
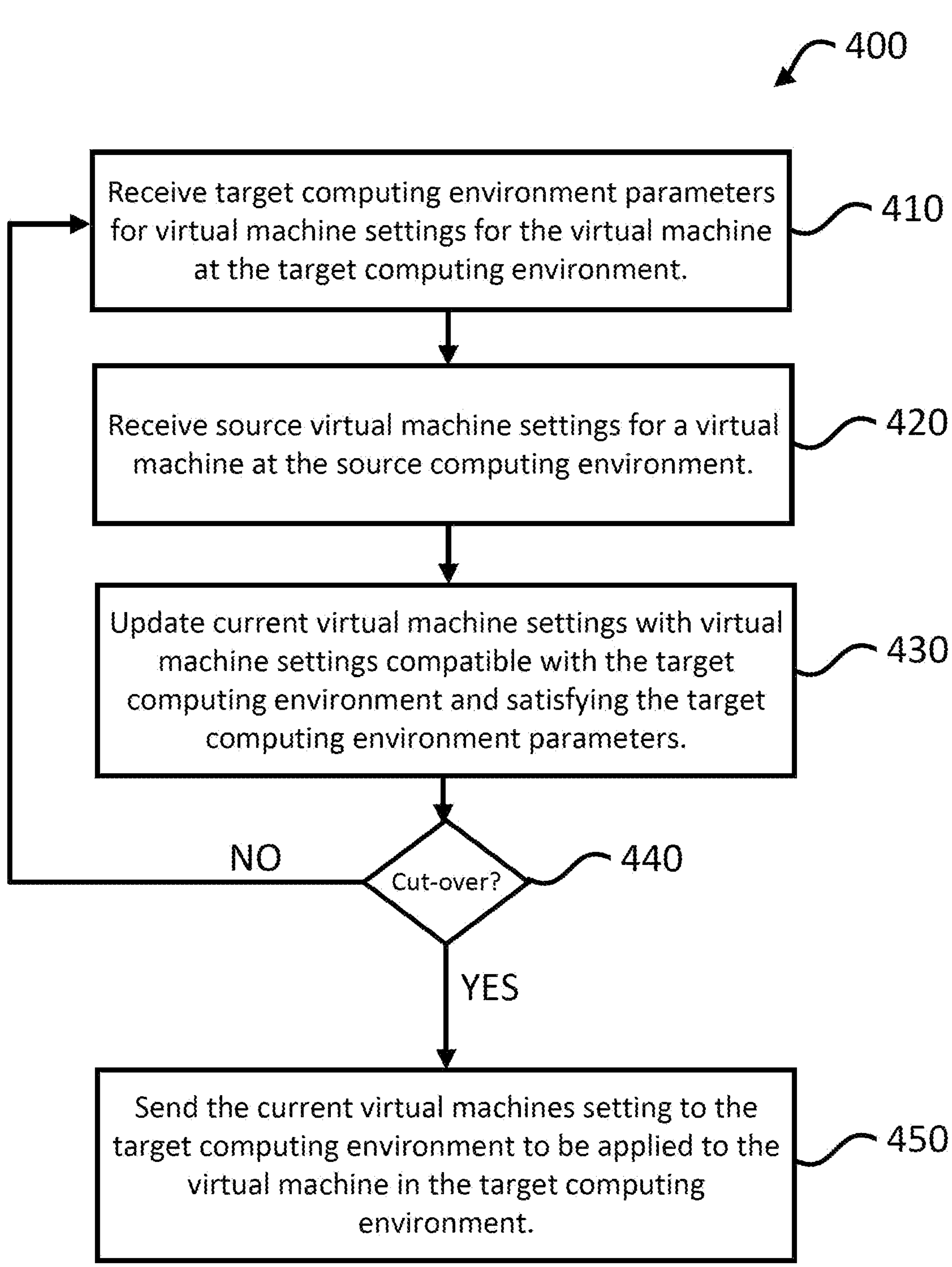
FIG. 4 is a flow diagram of an example process for performing migration over one or more migration cycles with virtual machine setting updates, according to aspects of the disclosure.

FIG. 4 is a flow diagram of an example process 400 for performing migration over one or more migration cycles with virtual machine setting updates, according to aspects of the disclosure.

The virtual machine settings engine receives target computing environment parameters for virtual machine settings for a virtual machine at the target computing environment, according to block 410.

The virtual machine settings engine receives source virtual machine settings for a virtual machine at the source computing environment, according to block 420. The virtual machine at the source computing environment can refer to the virtual machine being migrated to the target computing environment. As described herein with reference to FIG. 2, the virtual machine settings engine can convert the source virtual machine settings to a format corresponding to the target computing environment.

The virtual machine settings engine updates, using the source virtual machine settings, current target virtual machine settings with virtual machine settings compatible with the target computing environment and satisfying the target computing environment parameters, according to block 430. The current target virtual machine settings represent the virtual machine settings, which, when the migrating virtual machine has its cut-over operation performed or has a test clone created for it, will be used to configure the virtual machine in the target computing environment. In some examples, the virtual machine settings engine can receive initial virtual machine settings and set those as the current target virtual machine settings. The initial virtual machine settings can be, for example, converted source virtual machine settings, automatically generated settings based on a predetermined default specific to the target computing environment, and/or received through user input.

In some examples, the receiving of the source virtual machine settings and the updating of the current target virtual machines settings is performed for each migration cycle of the one or more migration cycles.

The virtual machine settings engine determines whether a cut-over operation is being or has been performed in the migration of the virtual machine in the source computing environment, according to decision block 440. If not, ("NO") then the virtual machine settings engine can repeat some or all of the operations according to blocks 410, 420, and 430. For example, the virtual machine settings engine can receive updated target computing environment parameters, current source virtual machine settings for the virtual machine at the source computing environment and update the current target virtual machine settings based on updates to the source virtual machine settings and/or target computing environment parameters. In some examples, the virtual machine settings engine can receive hardware utilization data for updating or generating current target virtual machine settings, for instance using right-sizing as described herein with reference to FIGS. 3-4. The hardware utilization data can be of a test clone of the virtual machine in the target computing environment generated during the migration, e.g., during a migration cycle.

In some examples, the virtual machine settings engine can monitor for updates to one or both of the target computing environment parameters or the source virtual machine settings, and trigger performing the receiving and the updating according to blocks 410-430.

If the virtual machine settings engine determines that a cut-over operation is being or has been performed, ("YES") then the virtual machine settings engine sends the current target virtual machine settings to the virtual machine in the target computing environment, according to block 450.

In some examples, the virtual machine settings engine can send user output indicating the current target virtual machine settings, receive user input specifying updated target computing environment parameter values, and update the current target virtual machine settings using the updated target computing environment parameter values. In some examples, the virtual machine settings engine may do this as one step, e.g., prompting for user input before performing the updating according to block 430.

Figure 5:
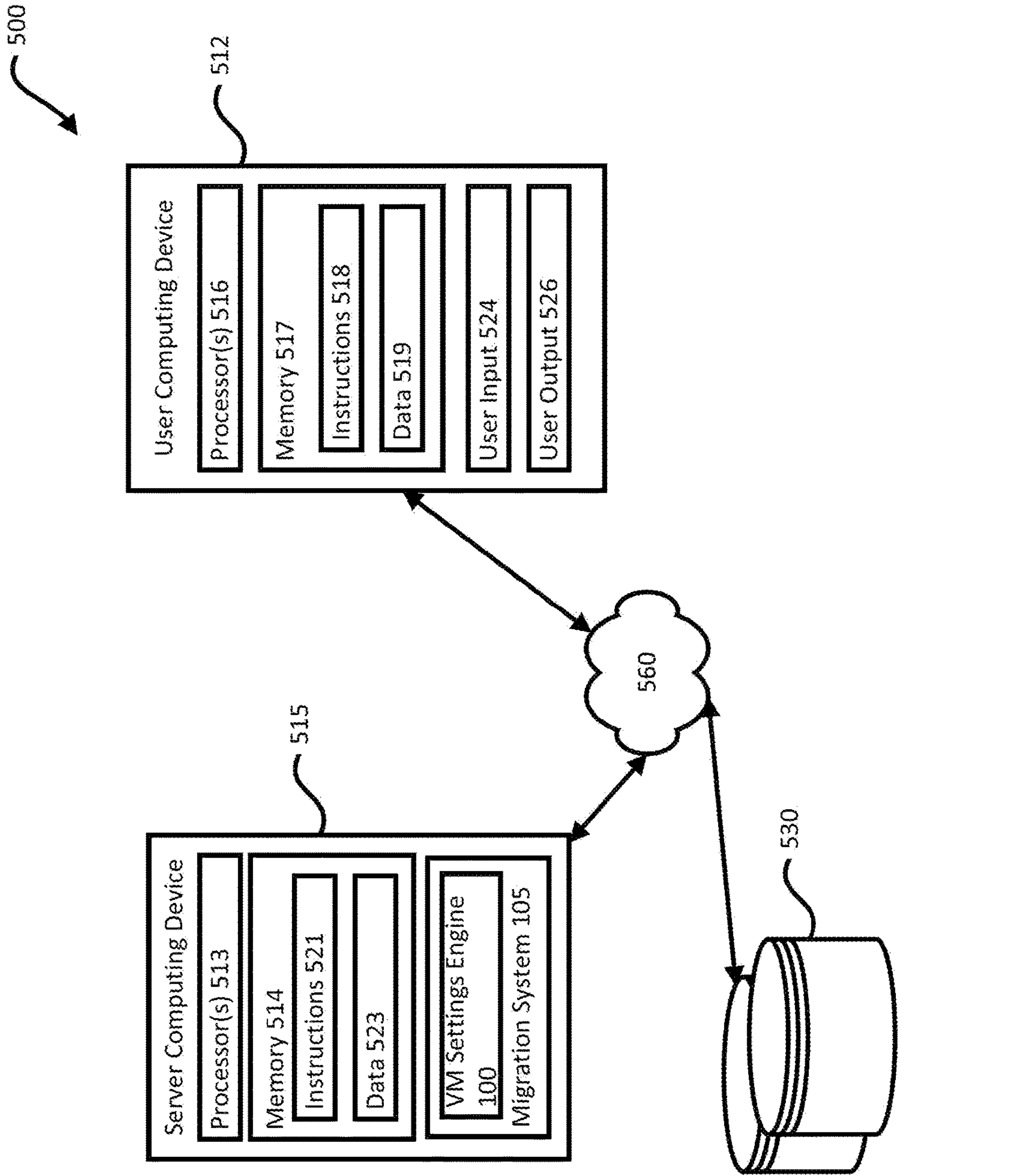
FIG. 5 is a block diagram of an example environment for implementing the migration system.

Example Computing Environment:

FIG. 5 is a block diagram of an example environment 500 for implementing the migration system 105 with virtual machine settings engine 100. The system 105 can be implemented on one or more devices having one or more processors in one or more locations, such as in server computing device 515, which itself may be an example of middleware 120 as shown in FIG. 1. User computing device 512 and the server computing device 515 can be communicatively coupled to one or more storage devices 530 over a network 560. The storage device(s) 530 can be a combination of volatile and non-volatile memory and can be at the same or different physical locations than the computing devices 512, 515. For example, the storage device(s) 530 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 515 can include one or more processors 513 and memory 514. The memory 514 can store information accessible by the processor(s) 513, including instructions 521 that can be executed by the processor(s) 513. The memory 514 can also include data 523 that can be retrieved, manipulated or stored by the processor(s) 513. The memory 514 can be a type of non-transitory computer readable medium capable of storing information accessible by the processor(s) 513, such as volatile and non-volatile memory. The processor(s) 513 can include one or more central processing units (CPUs), graphic processing units (GPUs), field-programmable gate arrays (FPGAs), and/or application-specific integrated circuits (ASICs), such as tensor processing units (TPUs).

The instructions 521 can include one or more instructions that when executed by the processor(s) 513, causes the one or more processors to perform actions defined by the instructions. The instructions 521 can be stored in object code format for direct processing by the processor(s) 513, or in other formats including interpretable scripts or collections of independent source code modules that are interpreted on demand or compiled in advance. The instructions 521 can include instructions for implementing the settings engine 100 consistent with aspects of this disclosure. The system 105 can be executed using the processor(s) 513, and/or using other processors remotely located from the server computing device 515.

The data 523 can be retrieved, stored, or modified by the processor(s) 513 in accordance with the instructions 521. The data 523 can be stored in computer registers, in a relational or non-relational database as a table having a plurality of different fields and records, or as JSON, YAML, proto, or XML documents. The data 523 can also be formatted in a computer-readable format such as, but not limited to, binary values, ASCII or Unicode. Moreover, the data 523 can include information sufficient to identify relevant information, such as numbers, descriptive text, proprietary codes, pointers, references to data stored in other memories, including other network locations, or information that is used by a function to calculate relevant data.

The user computing device 512 can also be configured similarly to the server computing device 515, with one or more processors 516, memory 517, instructions 518, and data 519. The user computing device 512 can also include a user output 526, and a user input 524. The user input 524 can include any appropriate mechanism or technique for receiving input from a user, such as keyboard, mouse, mechanical actuators, soft actuators, touchscreens, microphones, and sensors.

The server computing device 515 can be configured to transmit data to the user computing device 512, and the user computing device 512 can be configured to display at least a portion of the received data on a display implemented as part of the user output 526. The user output 526 can also be used for displaying an interface between the user computing device 512 and the server computing device 515. The user output 526 can alternatively or additionally include one or more speakers, transducers or other audio outputs, a haptic interface or other tactile feedback that provides non-visual and non-audible information to the platform user of the user computing device 512.

Although FIG. 5 illustrates the processors 513, 516 and the memories 514, 517 as being within the computing devices 515, 512, components described in this specification, including the processors 513, 516 and the memories 514, 517 can include multiple processors and memories that can operate in different physical locations and not within the same computing device. For example, some of the instructions 521, 518 and the data 523, 519 can be stored on a removable SD card and others within a read-only computer chip. Some or all of the instructions and data can be stored in a location physically remote from, yet still accessible by, the processors 513, 516. Similarly, the processors 513, 516 can include a collection of processors that can perform concurrent and/or sequential operation. The computing devices 515, 512 can each include one or more internal clocks providing timing information, which can be used for time measurement for operations and programs run by the computing devices 515, 512.

The server computing device 515 can be configured to receive requests to process data from the user computing device 512. For example, the environment 500 can be part of a computing platform configured to provide a variety of services to users, through various user interfaces and/or APIs exposing the platform services. One or more services can be a machine learning framework or a set of tools for generating neural networks or other machine learning models according to a specified task and training data. The user computing device 512 may receive and transmit data specifying target computing resources to be allocated for executing a neural network trained to perform a particular neural network task.

The devices 512, 515 can be capable of direct and indirect communication over the network 560. The devices 515, 512 can set up listening sockets that may accept an initiating connection for sending and receiving information. The network 560 itself can include various configurations and protocols including the Internet, World Wide Web, intranets, virtual private networks, wide area networks, local networks, and private networks using communication protocols proprietary to one or more companies. The network 560 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication. The network 560, in addition or alternatively, can also support wired connections between the devices 512, 515, including over various types of Ethernet connection.

Although a single server computing device 515 and user computing device 512 are shown in FIG. 5, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital circuits, computer-readable storage media, as one or more computer programs, or a combination of one or more of the foregoing. The computer-readable storage media can be non-transitory, e.g., as one or more instructions executable by processors of a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured to perform different operations should not be understood as requiring the components to be separated. The components, modules, programs, and engines described can be integrated together as a single system or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

With respect to the use of substantially any plural and/or singular terms herein, for example (with the term "element" being a stand-in for any system, component, data, etc.) "an/the element," "one or more elements," "multiple elements," a "plurality of elements," "at least one element," etc., those having skill in the art can translate from the plural to the singular and/or from the singular to the plural as is appropriate to the context and/or application described. The various singular/plural permutations may be expressly set forth herein, for sake of clarity and without limitation unless expressly indicated.

The invention claimed is:

1. A method comprising:

receiving, by one or more processors, target computing environment parameters for virtual machine settings for a virtual machine at a target computing environment;

receiving, by the one or more processors, source virtual machine settings for a virtual machine at a source computing environment; and updating, by the one or more processors and using the source virtual machine settings, current target virtual machine settings with virtual machine settings compatible with the target computing environment and satisfying the target computing environment parameters, wherein updating includes converting computing resources associated with the source virtual machine settings in the source computing environment to a different resource allocation compatible with one or more of the target computing environment parameters, and wherein the source computing environment and the target computing environment are different computing environments and hardware resources associated with a target virtual machine in the target computing environment is scaled to accommodate hardware resources associated with at least one source virtual machine in the source environment without exceeding hardware resources available in the target computing environment.

2. The method of claim 1, further comprising:

determining, by the one or more processors, that a current migration cycle of a migration of the virtual machine comprises performing a cut-over operation to complete the migration of the virtual machine to the target computing environment; and sending, by the one or more processors, the current target virtual machine settings to the target computing environment to be applied to the virtual machine in the target computing environment.

3. The method of claim 2, further comprising generating a test clone configured with the current target virtual machine settings.

4. The method of claim 2, further comprising:

receiving, by the one or more processors, initial virtual machine settings for the virtual machine before or during one or more migration cycles of the migration; and setting the initial virtual machine settings as the current target virtual machine settings.

5. The method of claim 2, wherein the method comprises repeatedly performing, by the one or more processors, the receiving of the source virtual machine settings and the updating of the current target virtual machine settings for each migration cycle of the one or more migration cycles.

6. The method of claim 5, wherein the method further comprises:

receiving, by the one or more processors, data characterizing hardware utilization of the virtual machine in the source computing environment; and updating, by the one or more processors, the initial virtual machine settings or the current target virtual machine settings based on at least the target computing environment parameters, the hardware utilization of the virtual machine in the source computing environment, and hardware constraints imposed on virtual machines in the target computing environment.

7. The method of claim 6, wherein updating the initial virtual machine settings or the current target virtual machine settings further comprises:

receiving, by the one or more processors, data characterizing hardware utilization of a test clone of the virtual machine in the target computing environment, the test clone generated during the one of the one or more migration cycles; and updating, by the one or more processors, the current target virtual machine settings further based on the received data characterizing hardware utilization of the test clone.

8. The method of claim 1, wherein the current target virtual machine settings comprise values characterizing a computing resource allocation for a migrating virtual machine.

9. The method of claim 1, further comprising:

determining, by the one or more processors, that the target computing environment parameters have been updated during the migration; and updating, by the one or more processors, the current target virtual machine settings with virtual machine settings compatible with the target computing environment and satisfying the updated target computing environment parameters.

10. The method of claim 1, further comprising:

sending, by the one or more processors, user output indicating the current target virtual machine settings;

receiving, by the one or more processors, user input specifying updated target computing parameter values; and updating, by the one or more processors, the current target virtual machine settings with virtual machine settings compatible with the target computing environment and satisfying the updated target computing environment parameters received in the user input.

11. A system comprising one or more processors, the one or more processors configured to:

receive target computing environment parameters for virtual machine settings for a virtual machine at a target computing environment;

receive source virtual machine settings for a virtual machine at a source computing environment;

update current target virtual machine settings with virtual machine settings compatible with the target computing environment and satisfying the target computing environment parameters, wherein the one or more processors are configured to the update current target virtual machine settings by converting computing resources associated with the source virtual machine settings in the source computing environment to a different resource allocation compatible with one or more of the target computing environment parameters and wherein the source computing environment and the target computing environment are different computing environments;

determine that a current migration cycle comprises performing a cut-over operation to complete the migration of the virtual machine to the target computing environment; and send the current target virtual machine settings to the target computing environment to be applied to the virtual machine in the target computing environment, and wherein hardware resources associated with a target virtual machine in the target computing environment is scaled to accommodate hardware resources associated with at least one source virtual machine in the source environment without exceeding hardware resources available in the target computing environment.

12. The system of claim 11, wherein the one or more processors are further configured to:

determining that a current migration cycle of a migration of the virtual machine comprises performing a cut-over operation to complete the migration of the virtual machine to the target computing environment; and in response to determining that the current migration cycle comprises performing the cut-over operation, sending the current target virtual machine settings to the target computing environment to be applied to the virtual machine in the target computing environment.

13. The system of claim 12, wherein the one or more processors are further configured to generate a test clone configured with the current target virtual machine settings.

14. The system of claim 9, wherein the one or more processors are further configured to:

receive initial virtual machine settings for the virtual machine before or during one or more migration cycles of the migration; and setting the initial virtual machine settings as the current target virtual machine settings.

15. The system of claim 14, wherein the one or more processors are further configured to:

repeatedly perform the receiving of the source virtual machine settings and the updating of the current target virtual machine settings for each migration cycle of the one or more migration cycles.

16. The system of claim 15, wherein the one or more processors are further configured to:

receive data characterizing hardware utilization of the virtual machine in the source computing environment; and update the initial virtual machine settings or the current target virtual machine settings based on at least the target computing environment parameters, the hardware utilization of the virtual machine in the source computing environment, and hardware constraints imposed on virtual machines in the target computing environment.

17. The system of claim 16, wherein in updating the initial virtual machine settings or the current target virtual machine settings, the one or more processors are further configured to:

receive data characterizing hardware utilization of a test clone of the virtual machine in the target computing environment, the test clone generated during the one of the one or more migration cycles; and update the current target virtual machine settings further based on the received data characterizing hardware utilization of the test clone.

18. The system of claim 11, wherein the current target virtual machine settings comprise values characterizing hardware executing a migrating virtual machine.

19. The system of claim 11, wherein the one or more processors are further configured to:

determine that the target computing environment parameters have been updated during the migration; and update the current target virtual machine settings with virtual machine settings compatible with the target computing environment and satisfying the updated target computing environment parameters.

20. One or more non-transitory computer-readable storage media comprising instructions that, when executed by one or more processors, cause the one or more processors to perform operations comprising:

receiving target computing environment parameters for virtual machine settings for a virtual machine at a target computing environment;

receiving source virtual machine settings for the virtual machine at a source computing environment;

updating current target virtual machine settings with virtual machine settings compatible with the target computing environment and satisfying the target computing environment parameters, wherein updating includes converting computing resources associated with the source virtual machine settings in the source computing environment to a different resource allocation compatible with one or more of the target computing environment parameters and wherein the source computing environment and the target computing environment are different computing environments;

determining that a current migration cycle of a migration of the virtual machine comprises performing a cut-over operation to complete the migration of the virtual machine to the target computing environment; and sending the current target virtual machine settings to the target computing environment to be applied to the virtual machine in the target computing environment, and wherein hardware resources associated with a target virtual machine in the target computing environment is scaled to accommodate hardware resources associated with at least one source virtual machine in the source environment without exceeding hardware resources available in the target computing environment.

* * * * *